United States Patent
Sun et al.

(10) Patent No.: US 11,212,672 B2
(45) Date of Patent: Dec. 28, 2021

(54) WIRELESS BODY AREA NETWORK, KEY GENERATION METHOD AND KEY DISTRIBUTION METHOD IN THE WIRELESS BODY AREA NETWORK, AND RELATED DEVICE

(71) Applicant: SHENZHEN INSTITUTES OF ADVANCED TECHNOLOGY CHINESE ACADEMY OF SCIENCES, Guangdong (CN)

(72) Inventors: Fangmin Sun, Guangdong (CN); Ye Li, Guangdong (CN)

(73) Assignee: SHENZHEN INSTITUTES OF ADVANCED TECHNOLOGY CHINESE ACADEMY OF SCIENCES, Shenzhen (CN)

( * ) Notice: Subject to any disclaimer, the term of this patent is extended or adjusted under 35 U.S.C. 154(b) by 0 days.

(21) Appl. No.: 17/036,222

(22) Filed: Sep. 29, 2020

(65) Prior Publication Data

US 2021/0092600 A1 Mar. 25, 2021

Related U.S. Application Data

(63) Continuation-in-part of application No. PCT/CN2019/106987, filed on Sep. 20, 2019.

(51) Int. Cl.
*H04M 1/66* (2006.01)
*H04M 1/68* (2006.01)
(Continued)

(52) U.S. Cl.
CPC ....... *H04W 12/0431* (2021.01); *H04L 9/0819* (2013.01); *H04L 9/0861* (2013.01);
(Continued)

(58) Field of Classification Search
CPC . H04W 12/0431; H04W 4/80; H04W 12/041; H04W 12/037; H04L 9/0861;
(Continued)

(56) References Cited

U.S. PATENT DOCUMENTS 10,716,495 B1 * 7/2020 Romrell ................. A61B 5/681
2016/0334218 A1 * 11/2016 Heshmati ............... G01C 21/00
(Continued)

FOREIGN PATENT DOCUMENTS

| CN | 105686833 | 6/2016 |
|----|-----------|--------|
| WO | 2016/087476 | 6/2016 |
| WO | 2016/165165 | 10/2016 |

OTHER PUBLICATIONS

Dunhee Shin, Sanseok Lee, Jongkil Kim, Yongrae Roh, Design and Fabrication of a new Multi-Active-Layer Transducer with a single-Copper-Layer FPCB, 2013 (Year: 2013).*
(Continued)

*Primary Examiner* — Tanmay K Shah
(74) *Attorney, Agent, or Firm* — Nixon & Vanderhye, P.C.

(57) ABSTRACT

The embodiments of the present disclosure are applicable to the technical field of computer science and application technology, and disclose a wireless body area network, a key generation method and a key distribution method in the wireless body area network, and a related device. The gait acceleration signal is extracted synchronously through the respective acceleration acquisition devices integrated with the coordinator and the wearable equipment, the position information corresponding to the peak value and the valley value in the gait acceleration signal is correspondingly extracted and is taken as the gait common information, and the gait common information is used to perform key distribution in the wireless body area network, the security and
(Continued)

the consistency are higher, the calculation is simplified, the key distribution method is suitable for wearable devices having limited resources.

20 Claims, 7 Drawing Sheets

(51) Int. Cl.
| | | |
|---|---|---|
| *H04M 3/16* | (2006.01) | |
| *H04W 12/0431* | (2021.01) | |
| *H04W 4/80* | (2018.01) | |
| *H04W 12/041* | (2021.01) | |
| *H04L 9/08* | (2006.01) | |
| *H04W 12/037* | (2021.01) | |

(52) U.S. Cl.
CPC ............ *H04W 4/80* (2018.02); *H04W 12/037* (2021.01); *H04W 12/041* (2021.01)

(58) Field of Classification Search
CPC ....... H04L 9/0819; H04L 9/0866; H04L 9/12; H04L 9/083; H04L 2209/805; H04L 63/06; H04L 9/0877; H04L 67/04; H04L 2209/24; H04L 2209/80; H04B 1/385; H04B 13/005; G01P 15/18
USPC ........................................................ 455/411
See application file for complete search history.

(56) References Cited

U.S. PATENT DOCUMENTS

| | | | |
|---|---|---|---|
| 2018/0063709 A1* | 3/2018 | Morrison | H04L 9/3236 |
| 2019/0209022 A1* | 7/2019 | Sobol | A61B 5/7435 |
| 2020/0244297 A1* | 7/2020 | Zalewski | H04W 76/10 |
| 2021/0052196 A1* | 2/2021 | Nicolas | A61B 5/112 |

OTHER PUBLICATIONS

International Search Report for PCT/CN2019/106987 dated Jun. 23, 2020, 4 pages.

* cited by examiner

WIRELESS BODY AREA NETWORK, KEY GENERATION METHOD AND KEY DISTRIBUTION METHOD IN THE WIRELESS BODY AREA NETWORK, AND RELATED DEVICE

CROSS-REFERENCE TO RELATED APPLICATION

This is a continuation-in-part of International application No. PCT/CN2019/106987 with an international filing date of Sep. 20, 2019, the contents of which are incorporated herein by reference in entirety.

TECHNICAL FIELD

The present disclosure belongs to the technical field of computer science and application technology, and particularly relates to a wireless body area network, a coordinator node, a wearable device, a key generation method in the wireless body area network, a key distribution method in the wireless body area network, and a computer readable storage medium.

BACKGROUND

With the rapid development of wireless body area network, more and more wearable devices are applied to various aspects of life including personal health management, mobile payment, tracking and positioning, social activity and entertainment, and the like.

In a wireless body area network, privacy and high security have the requirement on the data which is collected and transmitted by a wearable device. Additionally, the traditional method for safety of data transmission is not suitable for wearable devices having limited resources for the reason that these wearable devices have small storage space, limited energy and limited computing resources; moreover, a security level of the network security method for large-scale sensor network cannot meet the requirement of security application of the wearable devices.

At present, the security and the consistency of key distribution in the wireless body area network are worse, and the calculation of key distribution is very complicated, more computing resources need to be consumed, thus, the key distribution of the wireless body area network is not suitable for the wearable devices having limited resources.

Technical Problem

The embodiments of the present disclosure provides a wireless body area network, a coordinator node, a wearable device, a key generation method in the wireless body area network, a key distribution method in the wireless body area network and a computer readable storage medium, which aim at solving a technical problem that the security and the consistency of key distribution in the wireless body area network are worse currently, so that more resources are consumed.

Technical Solution

In a first aspect, the embodiments of the present disclosure provide a wireless body area network, including: a coordinator node and at least one wearable device in communication connection with the coordinator node, both the coordinator node and the wearable device are integrated with an acceleration acquisition device;

the coordinator node is configured to send a message of synchronously collecting data to the wearable device, to collect a first gait acceleration signal, to extract first gait common information in the first gait acceleration signal, to generate key encryption information according to a key to be distributed and the first gait common information, and to send the key encryption information to the wearable device;

the wearable device is configured to receive the message of synchronously collecting data, and synchronously collecting a second gait acceleration signal according to the message of synchronously collecting data, to extract second gait common information in the second gait acceleration signal, to receive the key encryption information; and to decrypt the key encryption information to obtain the key to be distributed according to the second gait common information;

wherein the first gait common information is position information corresponding to a peak value and a valley value of the first gait acceleration signal; the second gait common information is position information corresponding to a peak value and a valley value of the second gait acceleration signal.

It is apparent that, the acceleration collection devices respectively integrated in the coordinator node and the wearable device to synchronously collect the gait acceleration signal, the position information corresponding to the peak value and the valley value in the gait acceleration signal is extracted accordingly and is taken as the gait common information, and the gait common information is used to perform key distribution in the wireless body area network, the level of security and consistency is higher, the computation is simple, performing key distribution in the wireless body area network using the gait common information is applied to the wearable device having limited resources.

In particular, the extraction process of the position information corresponding to the peak value and the valley value of the gait acceleration signal is simpler and more convenient, such that fewer computation resources are consumed during the key distribution process in the wireless body area network, the key distribution in the wireless body area network is applied to the wearable device having limited resources. In the key distribution process, the position information is used as the gait common information for performing encryption and decryption, the level of security is much higher, moreover, it only needs to use the coordinator node to generate the key, and to use the gait common information coexist in the coordinator node and the wearable device to perform key distribution, the consistency is much higher.

In combination with the first aspect, in a first possible implementation mode, the coordinator node is specifically configured to:

generating the key to be distributed according to noise signal in the gait acceleration signal.

In a second aspect, the embodiments of the present disclosure provide a key distribution method in the wireless body area network being applied to a coordinator node of the wireless body area network, the coordinator node is integrated with an acceleration acquisition device and is in communication connection with at least one wearable device;

the method including:
sending a message of synchronously collecting data to the wearable device, wherein the message of synchronously collecting data is used to instruct the wearable device to collect a second gait acceleration signal synchronously;

collecting a first gait acceleration signal; extracting first gait common information in the first gait acceleration signal; generating key encryption information according to a key to be distributed and the first gait common information; and sending the key encryption information to the wearable device to instruct the wearable device to decrypt the key encryption information to obtain the key to be distributed, according to the second gait common information extracted from the second gait acceleration signal;

wherein the first gait common information is position information corresponding to a peak value and a valley value of the first gait acceleration signal; the second gait common information is position information corresponding to a peak value and a valley value of the second gait acceleration signal.

In a third aspect, the embodiments of the present disclosure provide a key distribution method in a wireless body area network being applied in a wearable device in the wireless body area network, the wearable device is integrated with an coordinator node; the method comprising:

sending a message of synchronously collecting data to the wearable device; synchronously collecting a second gait acceleration signal according to the message of synchronously collecting data; extracting second gait common information in the second gait acceleration signal; receiving key encryption information sent from the coordinator node, wherein the key encryption information is the first gait common information extracted from the first gait acceleration signal and information generated by the key to be distributed; and decrypting the key encryption information to obtain the key to be distributed, according to the second gait common information;

wherein the first gait common information is position information corresponding to a peak value and a valley value of the first gait acceleration signal; the second gait common information is position information corresponding to a peak value and a valley value of the second gait acceleration signal.

In a fourth aspect, embodiments of the present disclosure provide a key generation method in a wireless body area network being applied in a coordinator node of the wireless body area network, the coordinator node is integrated with an acceleration acquisition device; the method including: collecting a first gait acceleration signal; extracting a noise signal in the first gait acceleration signal; and generating a key to be distributed according to the noise signal.

In a fifth aspect, embodiments of the present disclosure provide a coordinator node, including an acceleration acquisition device, a memory, a processor and a computer program stored in the memory and executable by the processor, when the computer program is executed by the processor, the steps in the method according to any one of the second aspect and the fourth aspect are implemented.

In a sixth aspect, embodiments of the present disclosure provide a wearable device, including an acceleration acquisition device, a memory, a processor and a computer stored in the memory and executable by the processor, when the computer program is executed by the processor, the steps in the method according to the third aspect are implemented.

In a seventh aspect, embodiments of the present disclosure provide a computer readable storage medium which stores a computer program, when the computer program is executed by a processor, steps in the method according to any one of the second aspect and the fourth aspect are implemented.

In an eighth aspect, embodiments of the present disclosure provide a computer readable storage medium which stores a computer program, when the computer program is executed by a processor, steps in the method in the third aspect are implemented.

In a ninth aspect, embodiments of the present disclosure provide a computer program product, when the computer program product is executed on the coordinator node, the coordinator node is caused to implement the method in the second aspect and the fourth aspect.

In a tenth aspect, embodiments of the present disclosure provide a computer program product, when the computer program product is executed on a wearable device, the wearable device is caused to implement the method in the third aspect.

Advantageous Effects

In the embodiments of the present disclosure, the acceleration acquisition devices respectively integrated with the coordinator node and the wearable device are used to collect the acceleration signals simultaneously, and position information of peak value and valley value in the gait acceleration signal is extracted accordingly and is taken as the gait common information, the gait common information is used to perform key distribution in the wireless body area network, the key distribution method in the wireless body area network is much higher in the level of security and consistency, is simple in computation, and thus is suitable for the resource-limited wearable devices.

BRIEF DESCRIPTION OF THE DRAWINGS

In order to explain the technical solutions in the embodiments of the present disclosure more clearly, a brief introduction regarding the accompanying drawings that needs to be used for describing the embodiments or the prior art is given below; it is apparent that the accompanying drawings described herein are only some embodiments of the present disclosure, the person of ordinary skill in the art may also acquire other drawings according to the current drawings on the premise of paying no creative labor.

DESCRIPTION OF THE EMBODIMENTS

In the following description, in order to describe but not intended to limit the present disclosure, concrete details such as specific system structure, technique, and the like are disclosed, so that a comprehensive understanding of the embodiments of the present disclosure is facilitated.

A WBAN (Wireless Body Area Network) is a communication network which takes a human body as a center and is composed of various network elements associated with the human body. These network elements may be sensors distributed at various parts of the human body, and/or wearable devices worn on various parts of the human body. A wearable device 12 refers to a portable device that may be worn directly on the human body or integrated into a user's clothing or accessory, such as a smart watch, smart glass, smart bracelet, or other wearable physical sign monitoring device.

Figure 1:
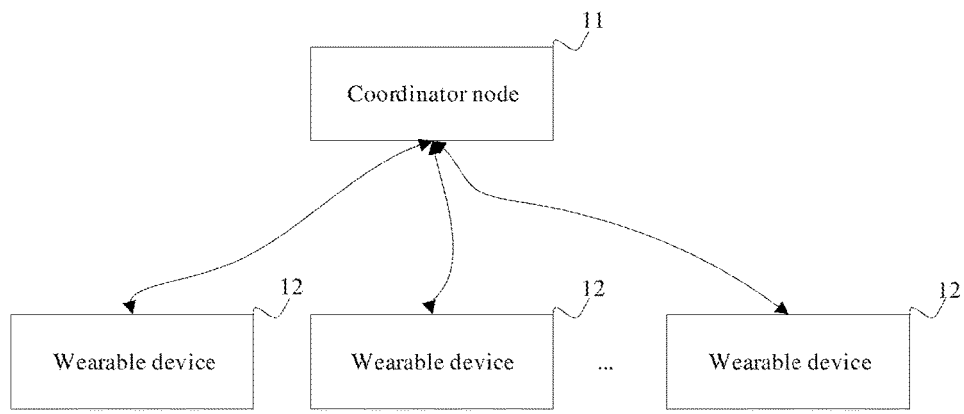
FIG. 1 illustrates a schematic flow diagram of a system architecture of a wireless body area network provided by one embodiment of the present disclosure.

Referring to FIG. 1, FIG. 1 illustrates a schematic flow diagram of a system architecture of a wireless body area network according to one embodiment of the present disclosure. The wireless body area network includes a coordinator node 11 and at least one wearable device 12 in communication connection with the coordinator node 11, both the coordinator node 11 and the wearable device 12 are integrated with an acceleration acquisition device. The acceleration acquisition device may be, but is not limited to, a three-axis acceleration sensor, the coordinator node 11 and the wearable device 12 may acquire a gait acceleration signal of the user through the acceleration acquisition device.

The coordinator node 11 is configured to send a message of synchronously collecting data to the wearable device 12; to collect a first gait acceleration signal; to extract first gait common information in the first gait acceleration signal; to generate key encryption information according to the key to be distributed and the first gait common information; and to send the key encryption information to the wearable device 12. The first gait common information is the position information corresponding to a peak value and a valley value of the first gait acceleration signal.

The wearable device 12 is configured to receive the message of synchronously collecting data, and synchronously acquire a second gait acceleration signal according to the message of synchronously collecting data; to extract second gait common information in the second gait acceleration signal; to receive the key encryption information; and to decrypt the key encryption information according to the second gait common information, and obtain the key to be distributed. The second gait common information is the position information corresponding to a peak value and a valley value of the second gait acceleration signal.

It should be noted that the aforesaid coordinator node 11 may also be referred to as a wearable gateway which may function as a gateway in the wireless body area network. The coordinator node 11 is in wireless communication connection with at least one wearable device 12, and the manner of performing wireless communication may be arbitrary.

In the key distribution process, the coordinator node 11 sends and broadcasts message of synchronously collecting data to various wearable devices, each wearable device 12 completes synchronous acquisition of the gait acceleration signal according to the message of synchronously collecting data, after receiving the message of synchronously collecting data. The synchronous acquisition of the gait acceleration signal refers to synchronously collecting the gait acceleration information at the same time by the acceleration acquisition devices of the coordinator node 11 and the wearable device 12. That is, the aforesaid first gait acceleration signal and the aforesaid second gait acceleration signal are acquired synchronously and are gait acceleration information at the same moment, the first and the second are merely used to indicate that the gait acceleration signal is acquired by which one of the coordinator node 11 and the wearable device 12.

After the gait acceleration signals are acquired synchronously by the coordinator node 11 and the wearable device 12, a corresponding key distribution process may be performed.

After collecting the first gait acceleration signal, the coordinator node 11 may extract gait common information according to the first gait acceleration signal, and then encrypt the key to be distributed according to the extracted first gait common information, and send the key encryption information obtained by encryption to the various wearable devices.

The wearable device 12 extracts the second gait common information in the second gait acceleration signal after the second gait acceleration signal is acquired; after the key encryption information sent by the coordinator node 11 is received, the wearable device 12 uses the second gait common information to perform decryption to obtain the key to be distributed. In this way, the key to be distributed generated by the coordinator node 11 may be shared to the various wearable devices in the wireless body area network, so that key distribution in the wireless body area network is realized. After key distribution is performed, a secret key may be used to perform data encryption and transmission between the coordinator node 11 and the various wearable devices.

It should be noted that the gait common information is the position information corresponding to the peak value and the valley value of the gait acceleration signal. In particular, in a gait acceleration signal curve, coding is performed correspondingly according to the position of the peak value and timing position of the valley value so as to obtain the position information. For example, when the gait common information is extracted through the sliding window, the sliding window is used to slide on the gait acceleration signal curve, when the peak value occurs in the first sliding window, the coding is 1, when the valley value occur in the second sliding window, the coding is −1, similarly, when the peak value and the valley value don't occur in the third sliding window, coding is not performed, the position information corresponding to the peak value and the valley value on the gait acceleration signal curve is extracted in sequence.

In some embodiments, the coordinator node 11 is specifically configured to: perform a low-pass filtering on the first gait acceleration signal; perform a dimension reduction operation on the low-pass filtered first gait acceleration signal to obtain a dimension-reduced first gait acceleration signal; extract the first position information corresponding to the peak value and the valley value of the dimension-reduced first gait acceleration signal in the time domain, and the first position information corresponding to the peak value and the valley value of the dimension-reduced first gait acceleration signal in the frequency domain, respectively.

Wherein, the filtering operation performed on the first gait acceleration signal may be specifically, but is not limited to, Butterworth low-pass filtering. The dimension reduction operation may be, but is not limited to, a PCA (Principal Component Analysis) algorithm, and a subsequent analysis is performed based on the dimension-reduced first gait acceleration signal.

For example, $$r\_signal = \begin{bmatrix} acc\_x_1 & acc\_x_2 & ... & acc\_x_M \\ acc\_y_1 & acc\_y_2 & ... & acc\_y_M \\ acc\_z_1 & acc\_z_2 & ... & acc\_z_M \end{bmatrix}$$

$$pca\_signal = E(:,1) * r\_signal$$

Wherein, r_signal is the aforesaid first gait acceleration signal, X, Y and Z represent the X-axis, the Y-axis and the Z-axis of three-axis acceleration, respectively, pca_signal is the first principal component after the PCA is used to perform dimension reduction. Of course, the dimension reduction algorithm may also be other algorithms, the dimension reduction algorithm is not limited herein.

After dimension reduction is performed on the first gait acceleration signal, the position information corresponding to the peak value and the valley value of the first gait acceleration signal in the time domain and the position information corresponding to the peak value and the valley value of the first gait acceleration signal in the frequency domain may be extracted. The method of extracting the position information may be arbitrary. In some embodiments, a signed sliding window coding algorithm may be used to perform extraction.

Furthermore, the coordinator node 11 is specifically configured to: extract the first position information corresponding to the peak value and the valley value of the dimension-reduced first gait acceleration signal, and the first position information corresponding to the peak value and the valley value of the fast Fourier transform result of the dimension-reduced first gait acceleration signal based on the signed sliding window coding algorithm;

wherein the process of SSWC (Signed Sliding Window Coding) specifically includes:

The signed sliding window slides on the dimension-reduced first gait acceleration signal, when a peak value occurs in the ith window, the common information pool increases by i; when a valley value occurs in the ith window, the common information pool decreases by i; when the peak value and/or the valley value don't occur in the ith window, the window continues to slide, wherein i is an integer. For example, when a peak value occurs in the first window, the common information pool increases by 1, when a valley value occurs in the fifth window, the common information pool decreases by 5.

Alternatively, the signed sliding window slides on the dimension-reduced first gait acceleration signal curve, when a peak value occurs in the ith window, the common information pool decreases by i; when a valley value occurs in the ith window, the common information pool increases by i; when the peak value and/or the valley value don't occur in the ith window, the window continues to slide, wherein i is an integer. For example, when a peak value occurs in the first window, the common information pool decreases by 1, when a valley value occurs in the fifth window, the common information pool increases by 5.

In particular, the signed sliding window coding algorithm is used to respectively extract the position information corresponding to the peak value and the valley value of the dimension-reduced first gait acceleration signal, and the position information corresponding to the peak value and the valley value of the fast Fourier transform result of the dimension-reduced first gait acceleration signal to obtain the first position information.

Figure 2:
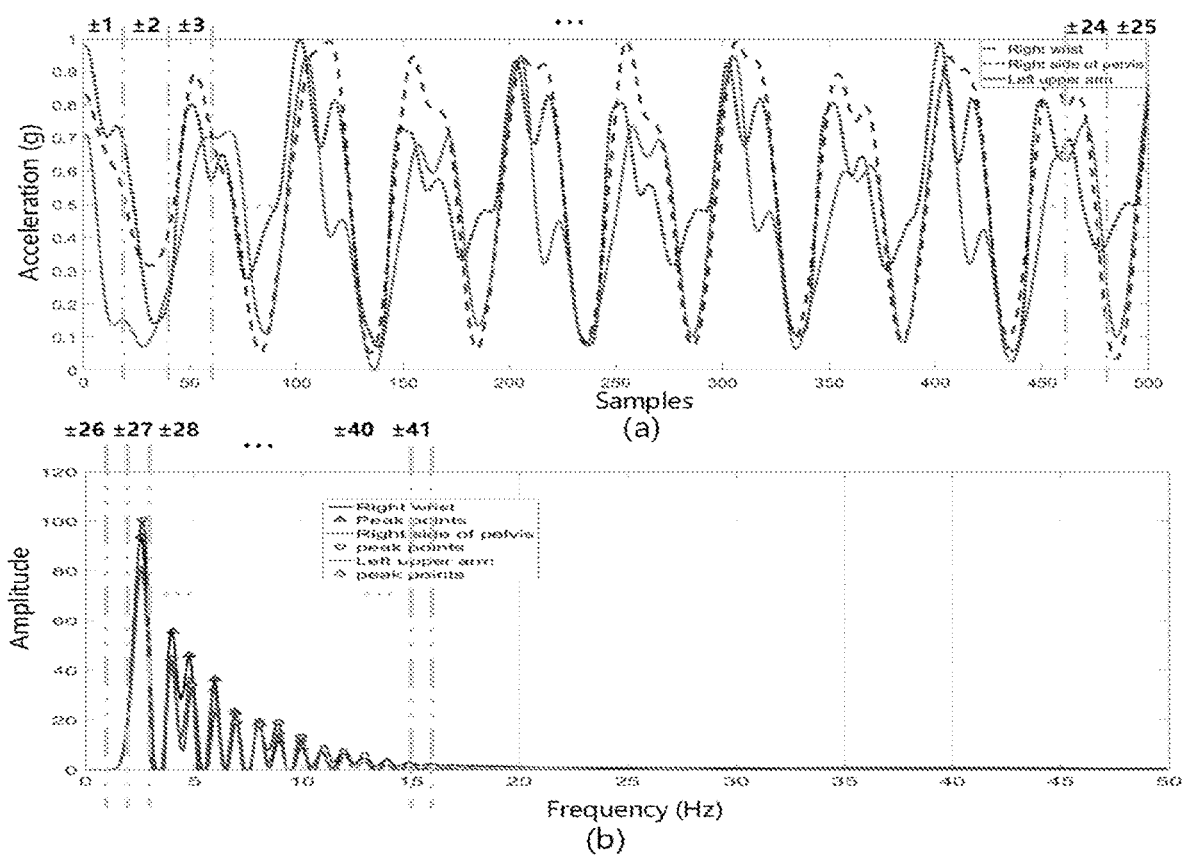
FIG. 2 illustrates a schematic diagram of a signed window coding provided by one embodiment of the present disclosure.

The window coding in the frequency domain is continued to be performed subsequent to window coding in the time domain, in specific application, the size of the sliding window in the time domain and in the frequency domain is $W_t$ and $W_f$, respectively, and values of $W_t$ and $W_f$ are determined by a sampling frequency of the gait acceleration signal. Referring to FIG. 2 which illustrates a schematic diagram of signed window coding. The $W_t$ is set to be 20 sample points, $W_f$ is set to be 1 Hz, and the gait acceleration signals in the time domain are correspondingly encoded into $\pm 1$, $\pm 2$, $\pm 3$, ..., $\pm 24$, $\pm 25$ according to the position of the peak value and the valley value; then, the gait acceleration signal curve in the time domain is continued to be encoded into $\pm 26$, $\pm 27$, $\pm 28$, ..., $\pm 40$, $\pm 41$, the corresponding coded information is obtained after completing coding of the gait acceleration signal in the time domain and in the frequency domain.

It may be seen that, the convenience of extraction of gait common information may be further improved through the signed sliding window algorithm, and the amount of calculation is reduced. In addition, a coding rate may be increased by using different signed values to represent the peak value and the valley value.

A gait common information extraction process of the wearable device 12 is similar to that of the coordinator node 11. In some embodiments, the wearable device 12 is specifically configured to: perform a low-pass filtering on a second gait acceleration signal; perform dimension reduction operation on the low-pass filtered second gait acceleration signal to obtain a dimension-reduced second gait acceleration signal; and extract the second position information corresponding to the peak value and the valley value of the dimension-reduced second gait acceleration signal in the time domain and the second position information corresponding to the peak value and the valley value of the dimension-reduced second gait acceleration signal in the frequency domain, respectively.

Wherein the dimension reduction operation may be, but is not limited to, a PCA dimension reduction algorithm. After dimension reduction is performed, the position information corresponding to the peak value and the valley value of the second gait acceleration signal in the time domain and the position information corresponding to the peak value and the valley value of the second gait acceleration signal in the frequency domain may be extracted, respectively. The position information may be extracted through the signed sliding window coding algorithm.

Furthermore, the wearable device 12 is specifically configured to:
extract the second position information corresponding to the peak value and the valley value of the dimension-reduced second gait acceleration signal and the second position information corresponding to the peak value and the valley value of the fast Fourier transform result of the dimension-reduced second gait acceleration signal based on the signed sliding window coding algorithm;

wherein the process of the signed sliding window coding algorithm specifically includes:

the signed sliding window slides on the dimension-reduced second gait acceleration signal curve, when a peak occurs in the ith window, the common information pool increases by i; when a valley value occurs in the ith window, the common information pool decreases by i; when a peak value and/or a valley value don't occur in the ith window, the window continues to slide, wherein i is an integer.

Alternatively, the signed sliding window slides on the dimension-reduced first gait acceleration signal curve, when a peak occurs in the ith window, the common information pool decreases by i; when a valley value occurs in the ith window, the common information pool increases by i; when a peak value and/or a valley value don't occur in the ith window, the window continues to slide, wherein i is an integer.

It needs be noted that the signed sliding window coding algorithm in the wearable device 12 is the same as the signed sliding window coding algorithm in the coordinator node 11, regarding the relevant introduction of the signed sliding window coding algorithm in the wearable device 12, reference may be made to the related description described above, the signed sliding window coding algorithm in the wearable device 12 is not repeatedly described herein.

It is worth noting that, the signed sliding window coding algorithm may enable the extraction process of gait common information to be simpler and more convenient, the calculation amount is greatly reduced, the signed sliding window coding algorithm is suitable for the wearable device 12 having limited computing resources.

After the first gait common information is extracted from the first gait acceleration signal by the coordinator node 11, the coordinator node 11 may use the first gait common information to encrypt the key to be distributed to obtain the encrypted key encryption information. In specific application, the key to be distributed may be encrypted using the first gait common information based on a fuzzy vault algorithm, and a fuzzy vault is constructed.

In some embodiments, the coordinator node 11 is specifically configured to divide the key to be distributed into N segments, wherein each segment of the key to be distributed is a coefficient of N-order polynomial; the fuzzy vault is established according to the first gait common information and the N-order polynomial, the fuzzy vault is key encryption information.

In particular, a M-bit key to be distributed is KEY_M, the M-bit key to be distributed is divided into N segments, that is, key_M=$C_0//C_1//C_2// \ldots //C_N$, each segment is one coefficient of the N-order polynomial, the N-order polynomial is specifically formulated as:

$$f(x)=C_0+C_1x+C_2x^2+ \ldots +C_Nx^N.$$

The first gait common information extracted by the coordinator node 11 is expressed as $(g_1, g_2, \ldots, g_k)$, K is greater than N, the first gait common information is put into the formula of $f(x)=C_0+C_1x+C_2x^2+ \ldots +C_Nx^N$ to obtain a set $p=\{(g_1, f(g_1)), (g_2, f(g_2)), \ldots, (g_k, f(g_k))\}$, then, a noise point set C is added in the set P to constitute the vault set V together, the coordinator node 11 sends the vault set V to the wearable device 12.

Of course, the method of obtaining key encryption information according to the first gait common information and the key to be distributed may not be limited to the fuzzy vault.

After the second gait common information is extracted by the wearable device 12, the wearable device 12 may wait until the key encryption information sent by the coordinator node 11 is received. After the key encryption information is received by the wearable device 12, the wearable device 12 may use the second gait acceleration information to decrypt the key encryption information to obtain the key to be distributed.

In a specific application, when the key encryption information is the fuzzy vault, the wearable device 12 is specifically configured to unlock the fuzzy vault according to the second gait common information to obtain the key to be distributed.

After the vault set V is received by the wearable device 12, the wearable device 12 searches the set P from the set V according to the second gait common information, and solves the polynomial f(x) according to the set P to obtain polynomial coefficients $C_0, C_1, C_2, \ldots, C_N$, and then splices the polynomial coefficients to obtain the M-bit key to be distributed.

In this way, the coordinator node 11 shares the key to be distributed to each of the wearable devices in the wireless body area network according to the gait common information in the gait acceleration signal.

It should be noted that the method of generating the key to be distributed may be arbitrary. For example, the gait acceleration signal may be used to generate the key to be distributed. In order to improve randomness and information entropy of the key to be distributed, the key to be distributed may be generated using a noise signal superposed on the gait acceleration signal. In some embodiments, the coordinator node 11 is specifically configured to generate the key to be distributed according to the noise signal in the first gait acceleration signal.

After the first gait acceleration signal is acquired by the coordinator node 11, the noise signal in the first gait acceleration signal may be extracted firstly, then, the key to be distributed is generated according to the noise signal. That is, the coordinator node 11 may be specifically configured to: extract the noise signal in the first gait acceleration signal; encode the noise signal to obtain a key; perform a key enhancement operation on the key to obtain the key to be distributed.

Generating the key to be distributed according to the noise signal superposed on the gait acceleration signal may include steps of noise extraction, noise coding, key enhancement, and the like.

Regarding a noise extraction step, the first gait acceleration signal may be filtered first, then, the filtered first gait acceleration signal is subtracted from the first gait acceleration signal before filtering and noise information is obtained. That is, the coordinator node 11 is specifically configured to perform zero-phase filtering on the first gait acceleration signal to obtain a filtered first gait acceleration signal; subtract the filtered first gait acceleration signal from the first gait acceleration signal to obtain the noise signal.

More specifically, the zero-phase filtering process specifically includes: inputting the first gait acceleration signal into a low-pass Butterworth filter to obtain a firstly filtered first gait acceleration signal as output by the low-pass Butterworth filter; performing a time reversal operation on the firstly filtered first gait acceleration signal to obtain a firstly inverted first gait acceleration signal; inputting the firstly inverted first gait acceleration signal to the low-pass Butterworth filter to obtain a secondly filtered first gait acceleration signal as output by the low-pass Butterworth filter; performing time reversal operation on the secondly filtered first gait acceleration signal to obtain a secondly inverted first gait acceleration signal, wherein the secondly inverted first gait acceleration signal is the filtered first gait acceleration signal.

In order to better describe the zero-phase filtering process provided by the embodiments of the present disclosure, a schematic flow diagram of zero-phase filtering is described below with reference with FIG. 3.

Figure 3:
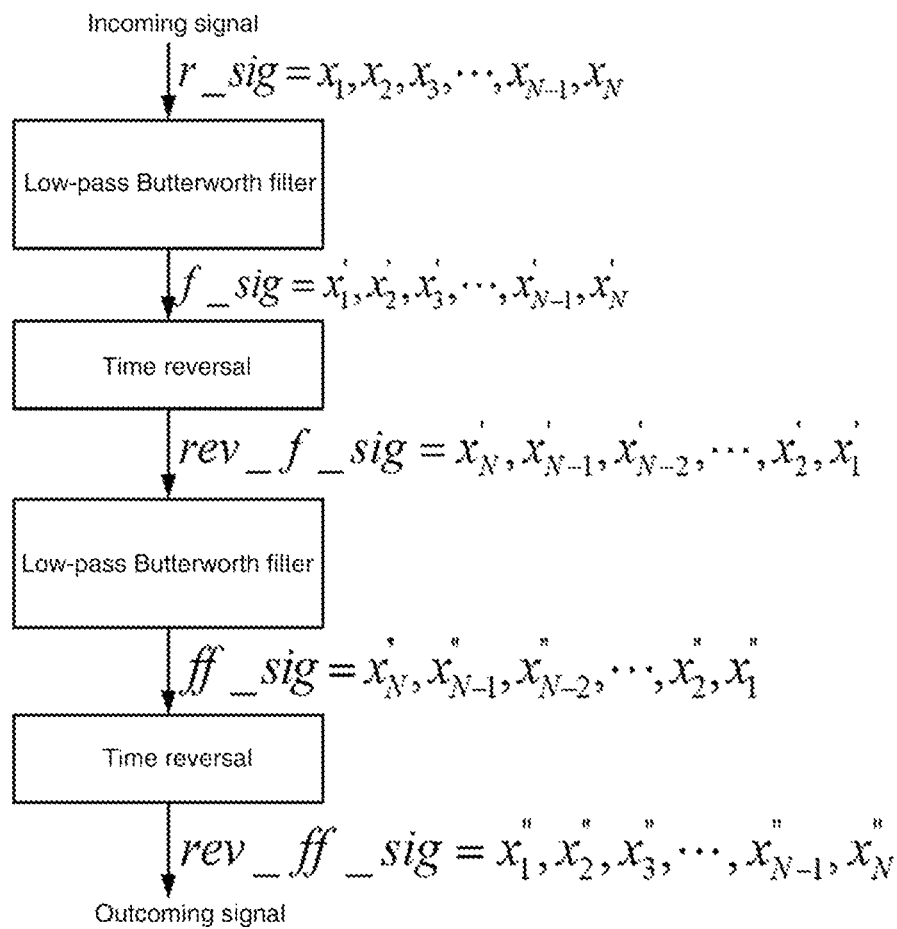
FIG. 3 illustrates a schematic flowchart of zero-phase filtering provided by one embodiment of the present disclosure.

As shown in FIG. 3, the original first gait acceleration signal r_sig=$x_1, x_2, x_3, \ldots, x_{N-1}, x_N$ is input into the low-pass Butterworth filter to obtain a firstly filtered first gait acceleration signal f_sig=$x_1, x_2, x_3, \ldots, x_{N-1}, x_N$; then, a time reversal operation is performed on the f_sig=$x_1', x_2', x_3', \ldots, x_{N-1}', x_N'$ to obtain a firstly inverted first gait acceleration signal rev_f_sig=$x_N', x_{N-1}', x_{N-2}', \ldots, x_2', x_1'$, then, rev_f_sig=$x_N', x_{N-1}', x_{N-2}', \ldots, x_2', x_1'$ is input into the low-pass Butterworth filter to obtain a secondly filtered first gait acceleration signal ff_sig=$x_N'', x_{N-1}'', x_{N-2}'', \ldots, x_2'', x_1''$; finally, a second time inversion is performed on the ff_sig=$x_N'', x_{N-1}'', x_{N-2}'', \ldots, x_2'', x_1''$ to obtain a secondly inverted first gait acceleration signal rev_ff_sig=$x_1'', x_2'', x_3'', \ldots, x_{N-1}'', x_N''$. The secondly inverted first gait acceleration signal rev_ff_sig=$x_1'', x_2'', x_3'', \ldots, x_{N-1}'', x_N''$ is exactly the first gait acceleration signal after zero-phase filtering.

Then, the zero-phase filtered first gait acceleration signal is subtracted from the original first gait acceleration signal to obtain the noise signal. That is, n_sig=r_sig−rev_ff_sig is the noise signal in the first gait acceleration signal.

After the noise signal in the first gait acceleration signal is extracted, the noise signal may be encoded. Generally, the acceleration acquisition device on the coordinator node 11 is a three-axis acceleration sensor, the acceleration signals of the X-axis, the Y-axis and the Z-axis are acquired by the three-axis acceleration sensor, at this point, the noise signal includes a first noise signal of the X-axis, a second noise signal of the Y-axis, and a third noise signal of the Z-axis, the coordinator node 11 is specifically configured to set the bit corresponding to the first binary random sequence as the corresponding value to obtain the first key, according to the numerical value of each bit in the first noise signal; to set a bit corresponding to the second binary random sequence as a corresponding value to obtain a second key, according to the numerical value of each bit in the second noise signal; to set a bit corresponding to the third binary random sequence as a corresponding value to obtain a third key, according to the numerical value of each bit in the third noise signal;

Wherein, if the kth bit in the noise signal is greater than or equal to 0, the kth bit of the binary random sequence is set as the first value; if the kth bit in the noise signal is less than 0, the kth bit of the binary random sequence is set as the second value, k is an integer.

In particular, the first value may be 1, and the second value is 0 accordingly. Of course, the first value may also be 0, and the second value is 1 accordingly.

For example, if the first bit in the first noise signal is greater than or equal to 0, the first bit of the first binary random sequence is set as 1, if the second bit in the first noise signal is less than 0, the second bit of the first binary random sequence is set as 0, and the like, the corresponding bit of the first binary random sequence is set as the corresponding value according to the numerical value of each bit in the first noise signal.

Figure 4:
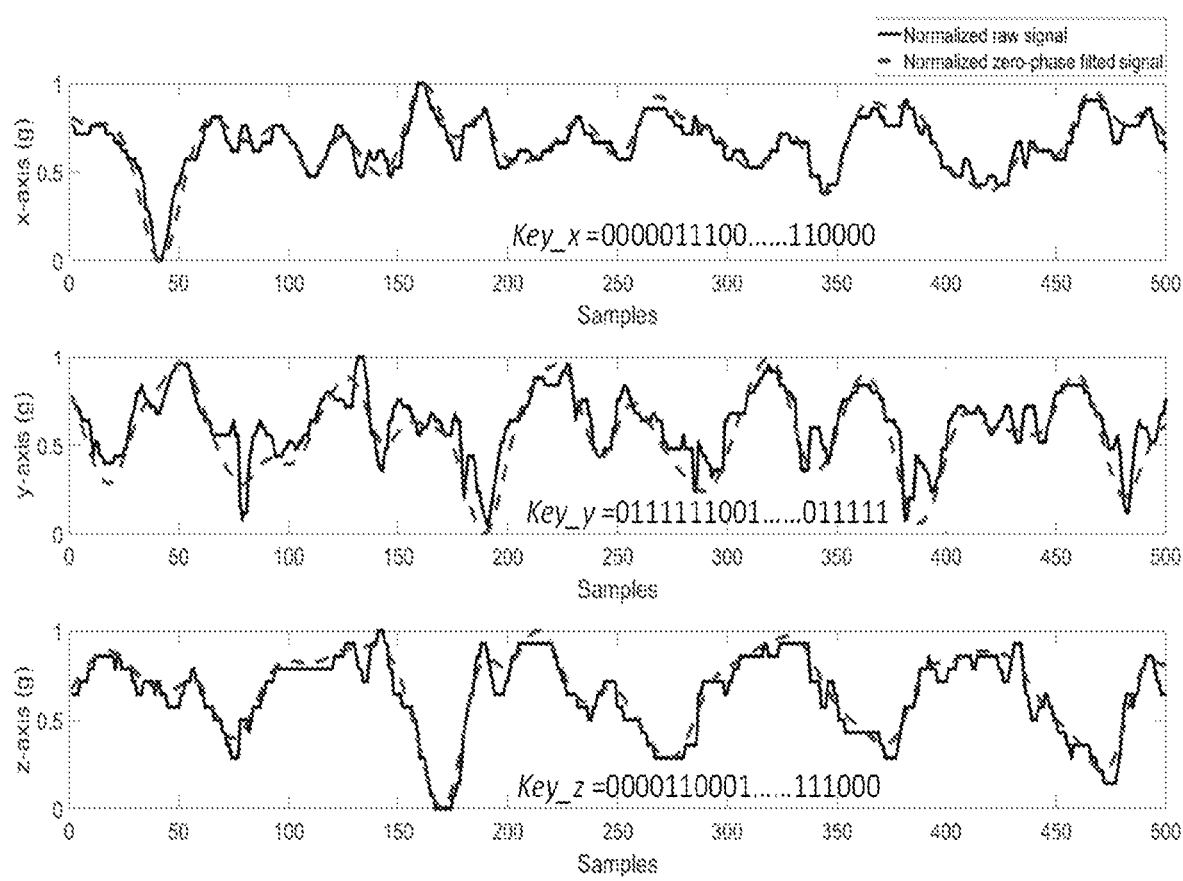
FIG. 4 illustrates a schematic diagram of encoding based on noise signal provided by one embodiment of the present disclosure.

Referring to FIG. 4 which illustrates a schematic diagram of performing encoding based on noise signal, FIG. 4 includes three images, that is, the gait acceleration signal curves corresponding to the X-axis, the Y-axis, and the Z-axis and a zero-phase filtered gait acceleration signal curve respectively from top to bottom. The binary random sequences key_x, key_y and key_z are obtained according to the original gait acceleration signal and the filtered gait acceleration signal, wherein key_x=0000011100 . . . 110000, key_y=0111111001 . . . 011111, key_z=0000110001 . . . 111000.

After encoding the noise signal, a key enhancement operation is performed on the obtained key. In some embodiments, a key enhancement process may specifically include: performing XOR (Exclusive OR) operation on the first key, the second key, and the third key to obtain an M-bit key to be distributed, that is, key_M=key_x$\oplus$C, key_y$\oplus$key_z.

In other embodiments, the key enhancement process further includes: performing XOR operation on the first key, the second key, and the third key to obtain a key being processed by XOR operation; performing down-sampling on the key that has performed XOR operation to obtain the key to be distributed.

It needs to be noted that performing an XOR operation on the key may further improve the randomness and the information entropy of the generated key to be distributed. Further, the down-sampling operation is further performed after the XOR operation, which may further improve the randomness and the information entropy of the key to be distributed.

After introducing the coordinator node 11 and the wearable device 12 in the wireless body area network, the work flow at the side of the coordinator node 11 and the work flow at the side of the wearable device 12 will be described below, respectively.

Figure 5:
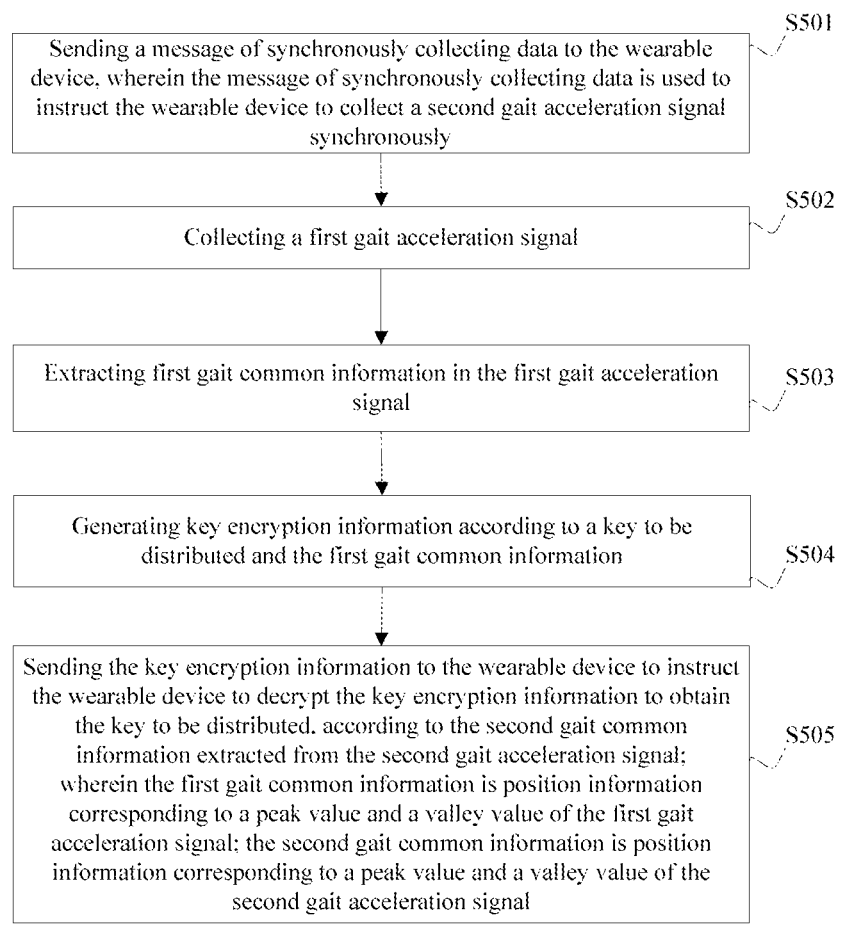
FIG. 5 illustrates a schematic flow diagram of a key distribution method in a wireless body area network provided by one embodiment of the present disclosure.

The work flow at the side of the coordinator node 11 is firstly introduced. Referring to FIG. 5 which illustrates a schematic flow diagram of a key distribution method in a wireless body area network provided by one embodiment of the present disclosure. This method may be applied in the coordinator node 11 in the wireless body area network. The coordinator node 11 is integrated with an acceleration acquisition device, and the coordinator node 11 is in communication connection with at least one wearable device 12. The method may include the following steps:

In step S501, sending message of synchronously collecting data to the wearable device 12, wherein the message of synchronously collecting data is used to instruct the wearable device 12 to synchronously acquire the second gait acceleration signal.

In particular, the coordinator node 11 broadcasts the message of synchronously collecting data, in order that the various wearable devices in the wireless body area network acquire the second gait acceleration signal synchronously through their respective acceleration sensors according to the message of synchronously collecting data, when the first gait acceleration signal is acquired by the coordinator node 11.

In step S502, collecting the first gait acceleration signal.

In step S503, extracting the first gait common information in the first gait acceleration signal.

Wherein, the extraction process of the first gait common information specifically includes: performing low-pass filtering on the first gait acceleration signal; performing dimension reduction operation on the low-pass filtered first gait acceleration signal to obtain a dimension-reduced first gait acceleration signal; extracting the first position information corresponding to the peak value and the valley value of the dimension-reduced first gait acceleration signal in the time domain and the first position information corresponding to the peak value and the valley value of the dimension-reduced first gait acceleration signal in the frequency domain, respectively.

More specifically, the process of extracting the first position information corresponding to the peak value and the valley value of the dimension-reduced first gait acceleration signal in the time domain and the first position information corresponding to the peak value and the valley value of the dimension-reduced first gait acceleration signal in the frequency domain respectively may include:

extracting the first position information corresponding to the peak value and the valley value of the dimension-reduced first gait acceleration signal and the first position information corresponding to the peak value and the valley value of a fast Fourier transform result of the dimension-reduced first gait acceleration signal based on a signed sliding window coding algorithm;

wherein the process of the signed sliding window coding algorithm specifically includes:

the signed sliding window slides on the dimension-reduced first gait acceleration signal, when a peak value occurs in the ith window, the common information pool increases by i; when a valley value occurs in the ith window, the common information pool decreases by i; when a peak value and/or a valley value don't occur in the ith window, the window continues to slide, wherein i is an integer.

It should be noted that regarding the relevant introduction of the extraction process of the first gait common information, reference may be made to the contents described above, the extraction process of the first gait common information will not be repeatedly described herein.

In step S504, generating the key encryption information according to the key to be distributed and the first gait common information.

It needs to be noted that the method of generating key encryption information may be, but is not limited to, a fuzzy vault. In some embodiments, when the key encryption information is the fuzzy vault, the specific process includes: segmenting the key to be distributed into N segments, wherein each segment of the key to be distributed is a coefficient of N-order polynomial; the fuzzy vault is established according to the first gait common information and the N-order polynomial, wherein the fuzzy vault is a key encryption information. Regarding the relevant introduction, reference may be made to the contents described above, which is not repeatedly described herein.

In step S505, sending the key encryption information to the wearable device 12 to instruct the wearable device to decrypt the key encryption information to obtain the key to be distributed, according to the second gait common information extracted from the second gait acceleration signal; wherein the first gait common information is the position information corresponding to the peak value and the valley value of the first gait acceleration signal; the second gait common information is the position information corresponding to the peak value and the valley value of the second gait acceleration signal.

In particular, after the coordinator node 11 sends the key encryption information to the various wearable devices in the wireless body area network, the wearable device 12 may decrypt the key encryption information according to the second gait common information extracted by itself to obtain the key to be distributed.

It is worth noting that, the method of generating the key to be distributed may be arbitrary. However, in order to improve the randomness and the information entropy of the key, a key may be generated based on the noise signal superposed on the gait acceleration signal.

Figure 6:
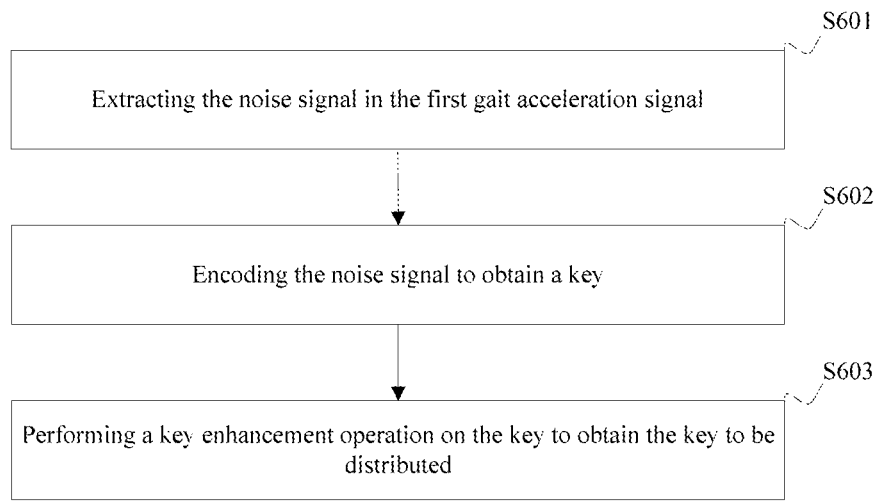
FIG. 6 illustrates a schematic flow diagram of generating a key to be distributed according to the noise signal provided by one embodiment of the present disclosure.

Referring to FIG. 6, FIG. 6 illustrates a schematic flow diagram of generating a key to be distributed according to a noise signal, the process of generating the key to be distributed according to a noise signal superposed on the first gait acceleration signal specifically includes:

In step S601, extracting the noise signal in the first gait acceleration signal.

Specifically, the extraction process of the noise signal specifically includes: performing zero-phase filtering on the first gait acceleration signal; and subtracting the filtered first gait acceleration signal from the first gait acceleration signal to obtain the noise signal superposed on the first gait acceleration signal. Wherein regarding the zero-phase filtering process, reference may be made to the relevant description corresponding to FIG. 3 above, the zero-phase filtering process will not be repeatedly described here.

In step S602, encoding the noise signal to obtain a key.

It needs to be noted that regarding the noise encoding process, reference may be made to the corresponding contents described above, the noise encoding process will not be repeatedly described herein.

In step S603, performing a key enhancement operation on the key to obtain the key to be distributed.

In particular, an XOR operation may be performed on the first key, the second key, and the third key to obtain the key to be distributed. The XOR operation may also be performed on the first key, the second key, and the third key to obtain keys being processed by XOR operation; then, a down-sampling is performed on the keys being processed by XOR operation to obtain the key to be distributed.

In some embodiments, the process of generating the key to be distributed is specifically: generating the key to be distributed according to the noise signal in the first gait acceleration signal.

Furthermore, the process for generating the key to be distributed according to the noise signal in the first gait acceleration signal may specifically include: extracting the noise signal in the first gait acceleration signal; encoding the noise signal to obtain a key; performing a key enhancement operation on the key to obtain the key to be distributed.

In particular, the process for extracting the noise signal in the first gait acceleration signal may include: performing zero-phase filtering on the first gait acceleration signal to obtain a filtered first gait acceleration signal; subtracting the filtered first gait acceleration signal from the first gait acceleration signal to obtain the noise signal.

The zero-phase filtering process specifically includes: inputting the first gait acceleration signal into a low-pass Butterworth filter to obtain a firstly filtered first gait acceleration signal as output by the low-pass Butterworth filter;

performing time reversal operation on the firstly filtered first gait acceleration signal to obtain a firstly inverted first gait acceleration signal;

inputting the firstly inverted first gait acceleration signal into the low-pass Butterworth filter to obtain a secondly filtered first gait acceleration signal as output by the low-pass Butterworth filter; and performing a time reversal operation on the secondly filtered first gait acceleration signal to obtain a secondly inverted first gait acceleration signal, wherein the secondly inverted first gait acceleration signal is the filtered first gait acceleration signal.

In some embodiments, the acceleration acquisition device is a three-axis acceleration sensor, the noise signal includes the first noise signal of the x-axis, the second noise signal of the y-axis, and the third noise signal of the z-axis;

The specific process of encoding the noise signal to obtain the key may include:
- setting a bit corresponding to the first binary random sequence as a corresponding value to obtain a first key, according to the numerical value of each bit in the first noise signal;
- setting a bit corresponding to the second binary random sequence as a corresponding value to obtain a second key, according to the numerical value of each bit in the second noise signal;
- setting a bit corresponding to the third binary random sequence as a corresponding value to obtain a third key, according to the numerical value of each bit in the third noise signal;
- wherein if the kth bit in the noise signal is greater than or equal to 0, the kth bit of the binary random sequence is set as the first value; if the kth bit in the noise signal is less than 0, the kth bit of the binary random sequence is set as the second value, wherein k is an integer.

Furthermore, performing key enhancement operation on the key to obtain the key to be distributed may include:
- performing an XOR operation on the first key, the second key, and the third key to obtain the key to be distributed;

or,
- performing an XOR operation on the first key, the second key, and the third key to obtain a key being processed by XOR operation;
- performing a down-sampling on the key being processed by XOR operation to obtain the key to be distributed.

In some embodiments, the process of extracting the first gait common information in the first gait acceleration signal may include:
- performing a low-pass filtering on the first gait acceleration signal;
- performing a dimension reduction operation on the low-pass filtered first gait acceleration signal to obtain a dimension-reduced first gait acceleration signal; and
- extracting the first position information corresponding to the peak value and the valley value of the dimension-reduced first gait acceleration signal in the time domain and the first position information corresponding to the peak value and the valley value of the dimension-reduced first gait acceleration signal in the frequency domain, respectively.

In some embodiments, the process of respectively extracting the first position information corresponding to the peak value and the valley value of the dimension-reduced first gait acceleration signal in the time domain and the first position information corresponding to the peak value and the valley value of the dimension-reduced first gait acceleration signal in the frequency domain specifically includes:
- extracting the first position information corresponding to the peak value and the valley value of the dimension-reduced first gait acceleration signal and the first position information corresponding to the peak value and the valley value of the fast Fourier transform result of the dimension-reduced first gait acceleration signal based on a signed sliding window coding algorithm;
- wherein the process of the signed sliding window coding algorithm specifically includes:
  - the signed sliding window slides on the dimension-reduced first gait acceleration signal curve, when a peak value occurs in the ith window, the common information pool increases by i; when a valley value occurs in the ith window, the common information pool decreases by i; when a peak value and/or a valley value don't occur in the ith window, the window continues to slide, wherein i is an integer.

In some embodiments, the process of generating the key encryption information according to the key to be distributed and the first gait common information specifically includes:
- segmenting the key to be distributed into N segments, wherein each segment of the key to be distributed is a coefficient of the N-order polynomial;
- According to the first gait common information and the N-order polynomial, generating a fuzzy vault, wherein the fuzzy vault is used as key encryption information.

It should be noted that regarding the relevant description of the work flow of the coordinator node 11, reference is made to other embodiments, the work flow of the coordinator node 11 is not repeatedly described herein.

After introducing the work flow at the side of the coordinator node 11, the work flow at the side of the wearable device 12 is introduced subsequently.

Figure 7:
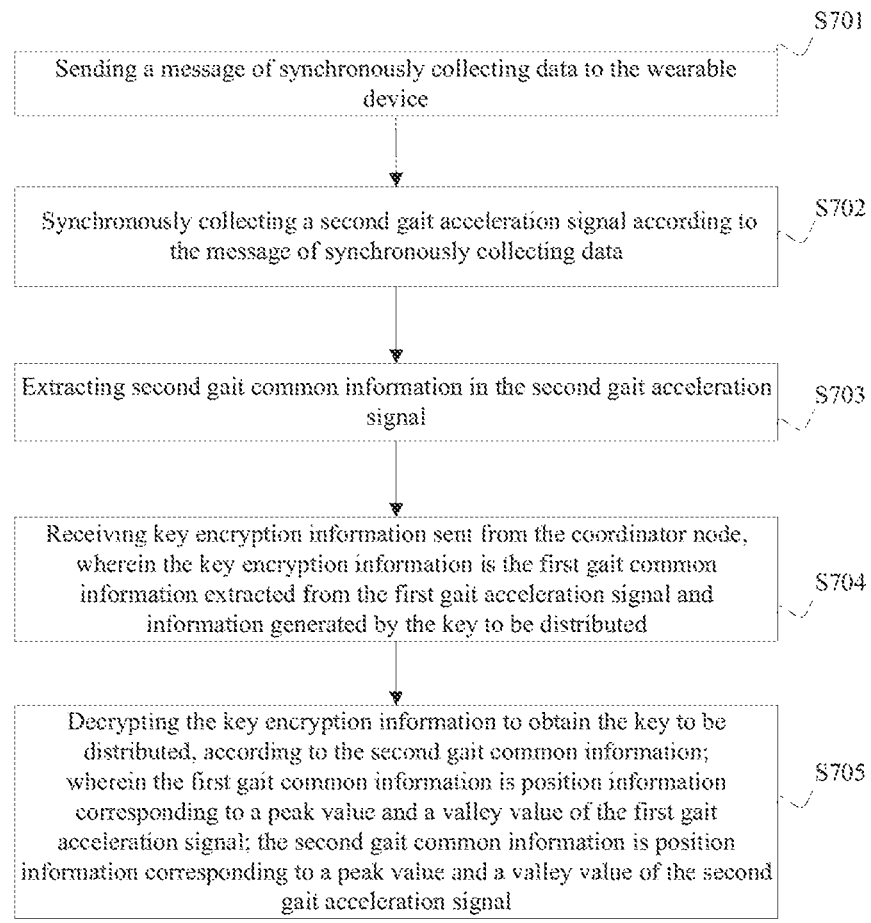
FIG. 7 illustrates a schematic flow diagram of a key distribution method in the wireless body area network provided by one embodiment of the present disclosure.

Referring to FIG. 7 which illustrates a schematic flow diagram of a key distribution method in a wireless body area network according to one embodiment of the present disclosure. This method may be applied to a wearable device 12 in a wireless body area network. The wearable device 12 is integrated with an acceleration acquisition device, and the wearable device 12 is in communication connection with the coordinator node 11. This method may include the following steps:

In step S701, receiving a message of synchronously collecting data sent by the coordinator node 11.

In step S702, synchronously collecting a second gait acceleration signal according to the message of synchronously collecting data.

In step S703, extracting the second gait common information in the second gait acceleration signal.

It should be noted that the extraction process of the second gait common information is similar to the extraction process of the first gait common information, besides, regarding the extraction process of the gait common information, reference may be made to the relevant contents described above, the extraction process of the gait common information is not repeatedly described here.

In step S704, receiving the key encryption information sent by the coordinator node, wherein the key encryption information is the information generated by the coordinator node according to the first gait common information extracted from the acquired first gait acceleration signal and the key to be distributed.

In step S705, decrypting the key encryption information according to the second gait common information to obtain the key to be distributed, wherein the first gait common information is the position information corresponding to the peak value and the valley value of the first gait acceleration signal; the second gait common information is the position information corresponding to the peak value and the valley value of the second gait acceleration signal.

In some embodiments, the process of extracting the second gait common information in the second gait acceleration signal may include:
- performing a low-pass filtering on the second gait acceleration signal;
- performing a dimension reduction operation on the low-pass filtered second gait acceleration signal to obtain a dimension-reduced second gait acceleration signal; and extracting the second position information corresponding to the peak value and the valley value of the dimension-reduced second gait acceleration signal in the time domain and the second position information corresponding to the peak value and the valley value of the dimension-reduced second gait acceleration signal in the frequency domain, respectively.

Furthermore, the process of respectively extracting the second position information corresponding to the peak value and the valley value of the dimension-reduced second gait acceleration signal in the time domain and the second position information corresponding to the peak value and the valley value of the dimension-reduced second gait acceleration signal in the frequency domain may include:

extracting second position information corresponding to the peak value and the valley value of the dimension-reduced second gait acceleration signal and second position information corresponding to the peak value and the valley value of a fast Fourier transform result of the dimension-reduced second gait acceleration signal based on a signed sliding window coding algorithm;

wherein the process of the signed sliding window coding algorithm specifically includes:

the signed sliding window slides on the dimension-reduced second gait acceleration signal curve, when a peak value occurs in the ith window, a common information pool increases by i; when a valley value occurs in the ith window, the common information pool decreases by i; when a peak value and/or a valley value don't occur in the ith window, the window continues to slide, wherein i is an integer.

In some embodiments, the key encryption information is a fuzzy vault, the process of decrypting the key encryption information according to the second gait common information to obtain the key to be distributed may include:

unlocking the fuzzy vault according to the second gait common information to obtain the key to be distributed.

It should be noted that regarding the relevant introduction of the work flow of the wearable device 12, reference may be made to other embodiments, the work flow of the wearable device 12 is not repeatedly described here.

After introducing the work flow at the side of the coordinator node 11 and the work flow at the side of the wearable device 12, the key generation process at the side of the coordinator node 11 will be independently described below.

Figure 8:
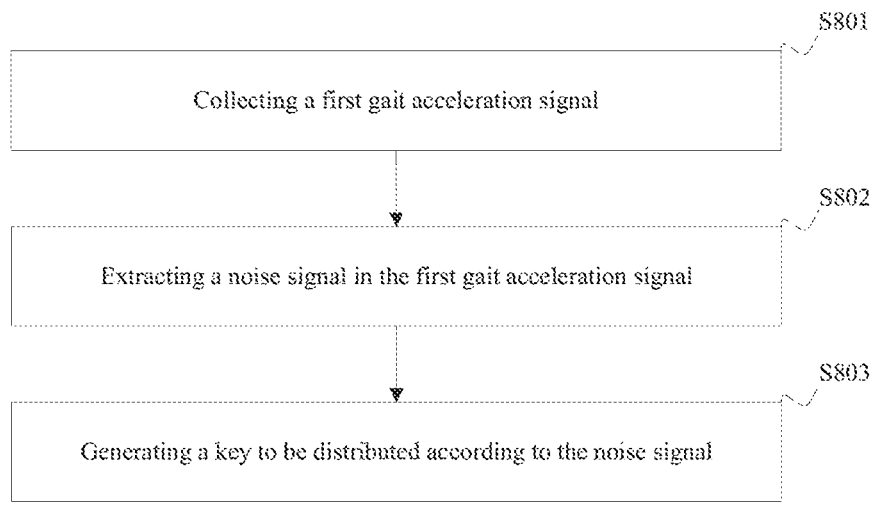
FIG. 8 illustrates a schematic flow diagram of a key generation method in the wireless body area network provided by one embodiment of the present disclosure.

Referring to FIG. 8 which illustrates a schematic flow diagram of a key generation method in a wireless body area network. The key generation method is applied to a coordinator node 11 in the wireless body area network. The coordinator node 11 is integrated with an acceleration acquisition device. The method may include the following steps:

In step S801, obtaining a first gait acceleration signal.

In step S802, extracting a noise signal in the first gait acceleration signal.

In step S803, generating a key to be distributed according to the noise signal.

In particular, zero-phase filtering may be performed on the first gait acceleration signal after collecting the first gait acceleration signal, then, the noise signal is extracted by subtracting the filtered first gait acceleration signal from the first gait acceleration signal. The noise signal is then encoded, a key enhancement operation is subsequently performed on the encoded noise signal to generate the key to be distributed.

The key to be distributed is generated by the noise signal superposed on the first gait acceleration signal, so that randomness and information entropy of the key may be improved.

In some embodiments, the process of extracting the noise signal in the first gait acceleration signal may include: performing zero-phase filtering on the first gait acceleration signal to obtain a filtered first gait acceleration signal; subtracting the filtered first gait acceleration signal from the first gait acceleration signal to obtain the noise signal. Furthermore, the process of performing zero-phase filtering on the first gait acceleration signal to obtain a filtered first gait acceleration signal may include: inputting the first gait acceleration signal to a low-pass Butterworth filter to obtain a firstly filtered first gait acceleration signal as output by the low-pass Butterworth filter; performing a time reversal operation on the firstly filtered first gait acceleration signal to obtain a firstly inverted first gait acceleration signal; inputting the firstly inverted first gait acceleration signal into the low-pass Butterworth filter to obtain a secondly filtered first gait acceleration signal as output by the low-pass Butterworth filter; performing a time reversal operation on the secondly filtered first gait acceleration signal to obtain a secondly inverted first gait acceleration signal, wherein the secondly inverted first gait acceleration signal is the filtered first gait acceleration signal.

In some embodiments, the process of generating the key to be distributed according to the noise signal may include: encoding the noise signal to obtain a key; performing a key enhancement operation on the key to obtain the key to be distributed.

In some embodiments, the acceleration acquisition device is a three-axis acceleration sensor, the noise signal includes a first noise signal of the x-axis, a second noise signal of the y-axis, and a third noise signal of the z-axis;

The process of encoding the noise signal to obtain a key may include: setting a bit corresponding to the first binary random sequence as a corresponding value to obtain a first key, according to a numerical value of each bit in the first noise signal; setting a bit corresponding to the second binary random sequence as a corresponding value to obtain a second key, according to a numerical value of each bit in the second noise signal; setting a bit corresponding to the third binary random sequence as a corresponding value to obtain a third key, according to a numerical value of each bit in the third noise signal;

Wherein the kth bit of the binary random sequence is set as the first value if the kth bit in the noise signal is greater than or equal to 0; the kth bit of the binary random sequence is set as the second value if the kth bit in the noise signal is less than 0, wherein k is an integer.

In some embodiments, the process of performing the key enhancement operation on a key to obtain the key to be distributed may include: performing an XOR (Exclusive OR) operation on the first key, the second key, and the third key to obtain the key to be distributed; or, performing an XOR operation on the first key, the second key and the third key to obtain keys being processed by XOR operation; and performing a down-sampling on the keys being processed by XOR operation to obtain the key to be distributed.

It should be noted that, regarding detailed description of the process of generating the key to be distributed according to the noise signal superposed on the first gait acceleration signal, reference may be made to the related contents mentioned above, the process of generating to key to be distributed is not repeatedly described here.

It should be understood that the technical solution of generating a secret key according to noise signal provided by the embodiments of the present disclosure also falls within the scope of the embodiments of the present disclosure.

Figure 9:
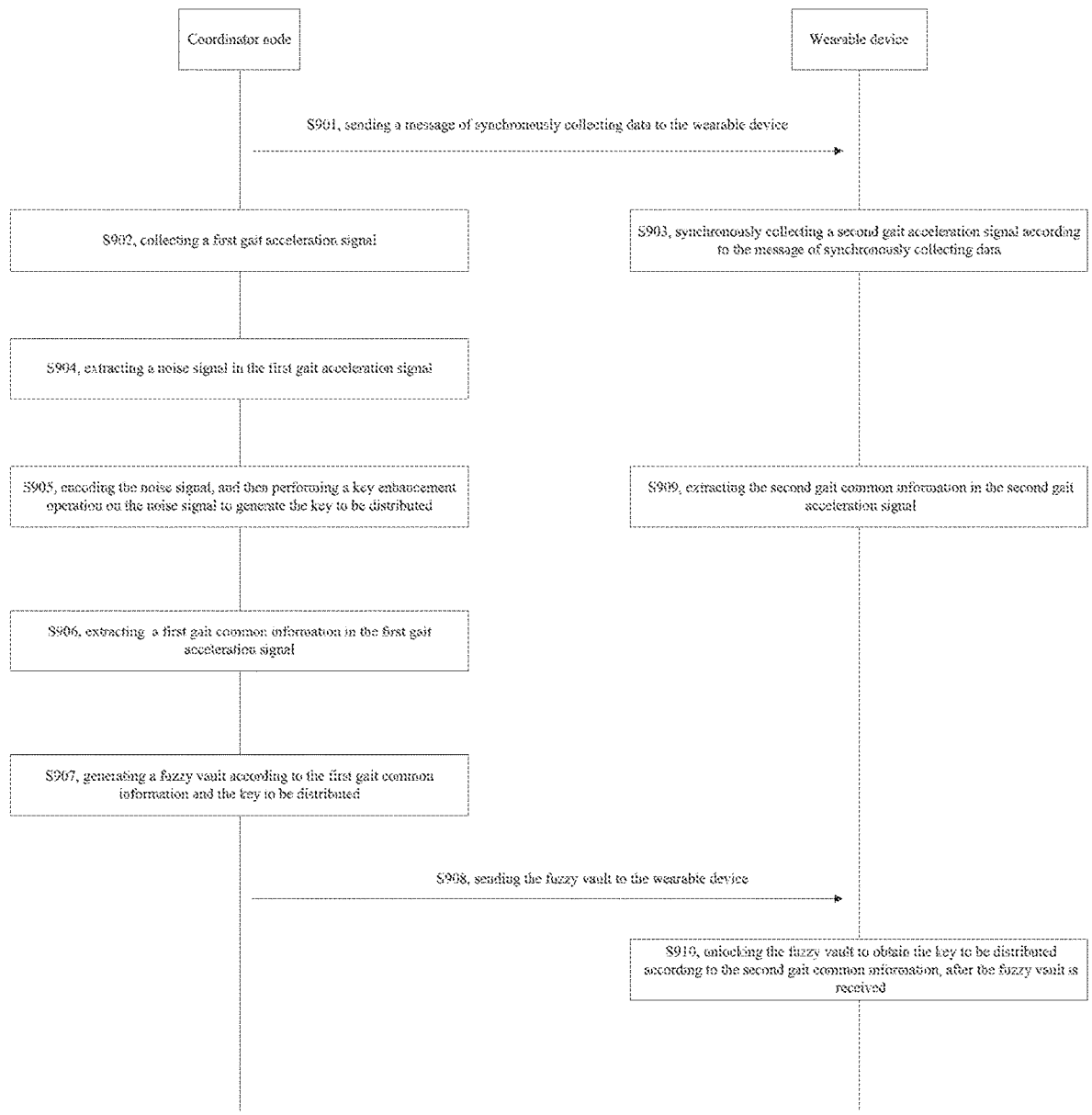
FIG. 9 illustrates a schematic diagram of interaction between a coordinator and a wearable device provided by one embodiment of the present disclosure.

An interaction between a coordinator node and a wearable device 12 is described below with reference to a schematic diagram of interaction between the coordinator node 11 and the wearable device 12 shown in FIG. 9. The process of interaction between the coordinator 11 and the wearable device 12 may include:

In step S901, sending the message of synchronously collecting data to the wearable device 12 by the coordinator node 11.

In step S902, collecting a first gait acceleration signal by the coordinator node 11.

In step S903, synchronously collecting a second gait acceleration signal by the wearable device 12 according to the message of synchronously collecting data.

In step S904, extracting a noise signal in the first gait acceleration signal by the coordinator node 11.

In step S905, performing a key enhancement operation to generate the key to be distributed after the noise signal is encoded by the coordinator node 11.

In some other embodiments, the key to be distributed may also be generated according to the first gait acceleration signal or by other methods. However, the randomness and the information entropy of the key may be improved by generating the key to be distributed using the noise signal in the gait acceleration signal.

In step S906, extracting the first gait common information in the first gait acceleration signal by the coordinator node 11.

Wherein the first gait common information refers to the position information corresponding to the peak value and the valley value of the first gait acceleration signal. Regarding the extraction process of the gait common information, reference may be made to the corresponding contents described above, the extraction process of the gait common information is not repeatedly described here.

In step S907, generating a fuzzy vault according to the gait common information and the key to be distributed by the coordinator node 11.

It should be understood that, other methods may also be used to encrypt the key to be distributed in other embodiments.

In step S908, sending a fuzzy vault to the wearable device 12 by the coordinator node 11.

In step S909, extracting the second gait common information in the second gait acceleration signal by the wearable device 12.

Wherein the second gait common information refers to the position information corresponding to the peak value and the valley value of the second gait acceleration signal. Regarding the extraction process of gait common information, reference may be made to the corresponding contents described above, the extraction process of the gait common information is not repeatedly described here.

In step S910, unlocking the fuzzy vault according to the second gait common information to obtain the key to be distributed by the wearable device 12, after receiving the fuzzy vault is received.

It should be understood that, value of serial number of the steps in the aforesaid embodiment doesn't mean a sequencing of execution sequences of the steps, the execution sequence of each of the steps should be determined by functionalities and internal logics of the steps themselves, and shouldn't be regarded as limitation to an implementation process of the embodiment of the present disclosure.

Figure 10:
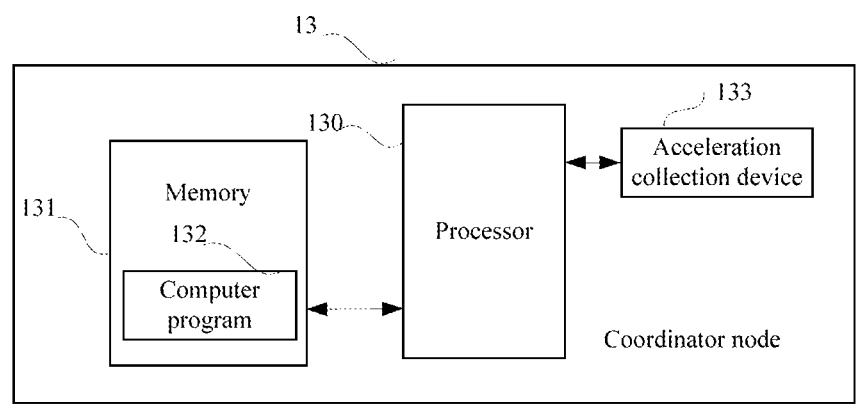
FIG. 10 illustrates a schematic structural diagram of the coordinator node provided by one embodiment of the present disclosure.

FIG. 10 illustrates a schematic structural diagram of a coordinator node according to one embodiment of the present disclosure. As shown in FIG. 10, the coordinator node 13 in this embodiment includes at least one processor 130, a memory 131, and a computer program stored in the memory 131 and executable by the at least one processor 130, when the computer program 132 is executed by the processor 130, the steps in any one of the various key distribution method embodiments in the wireless body area network or the key generation method embodiments in the wireless body area network are implemented.

The coordinator node 13 may be a wearable gateway, and may include, but is not limited to, a processor 130, a memory 131 and an acceleration acquisition device 133. The person of ordinary skill in the art may be aware of the fact that, FIG. 10 is merely an example of the coordinator node 13, and is not constituted as limitation to the coordinator node 13, more or less components shown in FIG. 10 may be included, or some components or different components may be combined; for example, an input and output device, a network access device, a bus, and the like may also be included.

The so called processor 130 may be CPU (Central Processing Unit), and can also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor may be a microprocessor, or alternatively, the processor can also be any conventional processor and so on.

The memory 131 in some embodiments may be an internal storage unit of the coordinator node 10, such as a hard disk or a memory of the coordinator node 13. The memory 131 may also be an external storage device of the coordinator node 13, such as a plug-in hard disk, a SMC (Smart Media Card), a SD (Secure Digital) card, a FC (Flash Card) equipped on the coordinator node 13. Furthermore, the memory 131 may not only include the internal storage unit of the coordinator node 13 but also include the external storage device of the coordinator node 13. The memory 131 is further configured to store operating system, application program, BootLoader, data and other program such as program code of the computer program, and so on. The memory 131 may also be configured to store data that has been output or being ready to be output temporarily.

Figure 11:
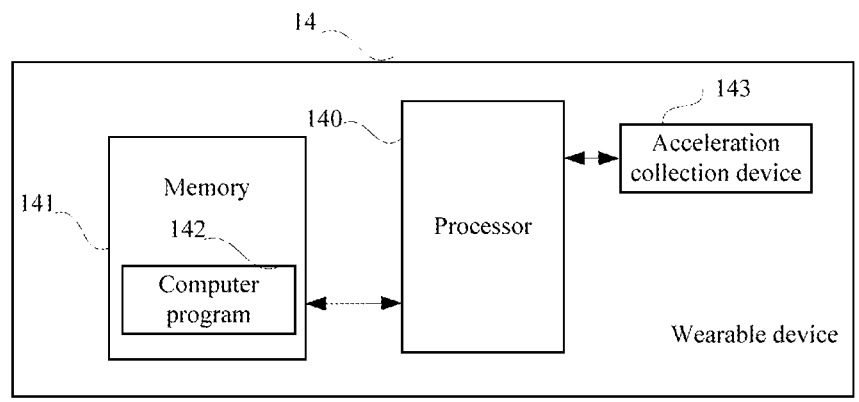
FIG. 11 illustrates a schematic structural diagram of the wearable device provided by one embodiment of the present disclosure.

FIG. 11 illustrates a schematic structural diagram of a wearable device 14 according to one embodiment of the present disclosure. As shown in FIG. 11, the wearable device 14 in this embodiment includes at least one processor 140, a memory 141, and a computer program 142 stored in the memory 141 and executable by the at least one processor 140, when the computer program 142 is executed by the processor 140, the steps in any one of the various key distribution method embodiments in the wireless body area network are implemented.

The wearable device 14 may be a wearable watch, a smart handle loop and a smart class and the like. The wearable device may include, but is not limited to, a processor 140, a memory 141 and an acceleration acquisition device 143. The person of ordinary skill in the art may be aware of the fact that, FIG. 11 is merely an example of the wearable device 14, and is not constituted as limitation to the wearable device 14, more or less components shown in FIG. 11 may be included, or some components or different components may be combined; for example, an input and output device, a network access device, a bus, and the like may also be included.

The so called processor 140 may be CPU (Central Processing Unit), and can also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor may be a microprocessor, or alternatively, the processor can also be any conventional processor and so on.

The memory 141 in some embodiments may be an internal storage unit of the wearable device 14, such as a hard disk or a memory of the wearable device 14. The memory 141 may also be an external storage device of the wearable device 14, such as a plug-in hard disk, a SMC (Smart Media Card), a SD (Secure Digital) card, a FC (Flash Card) equipped on the wearable device 14. Further, the memory 141 may not only include the internal storage unit of the wearable device 14 but also include the external storage device of the wearable device 14. The memory 141 is further configured to store operating system, application program, BootLoader, data and other program such as program code of the computer program, and so on. The memory 141 may also be configured to store data that has been output or being ready to be output temporarily.

The present disclosure further provides a computer readable storage medium, the computer program storage medium stores a computer program, when the computer program is executed by the processor, the steps in the various key distribution method embodiments in the wireless body area network or the various key generation method embodiments in the wireless body area network are implemented.

A computer program product is provided in the present disclosure, when the computer program product is executed on the coordinator node 13, the coordinator node 13 may be caused to execute the computer program product to realize the steps in the various key distribution method embodiments or the various key generation method embodiments in the wireless body area network. As an alternative, when the computer program product is executed on the wearable device 14, the wearable device 14 is caused to execute the computer program product to realize the steps in the various key distribution method embodiments in the wireless body area network.

In the aforesaid embodiments, the description of each of the embodiments is emphasized respectively, regarding a part of one embodiment which isn't described or disclosed in detail, reference may be made to the relevant descriptions in other embodiments.

The person of ordinary skill in the art may be aware of that, the elements and algorithm steps of each of the examples described in connection with the embodiments disclosed here can be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present disclosure.

As stated above, the aforesaid embodiments are only intended to explain but not to limit the technical solutions of the present disclosure. Although the present disclosure has been explained in detail with reference to the above-described embodiments, it should be understood by the ordinary skilled one in the art that, the technical solutions described in each of the embodiments mentioned above may still be amended, or some technical features in the technical solutions may be replaced equivalently; these amendments or equivalent replacements, which doesn't cause the essence of corresponding technical solution to be broken away from the spirit and the scope of the technical solution in various embodiments of the present disclosure, should all be included in the protection scope of the present disclosure.

What is claimed is:

1. A wireless body area network, comprising: a coordinator node and at least one wearable device in communication with the coordinator node, both the coordinator node and the at least one wearable device being integrated with an acceleration acquisition device, wherein:
   the coordinator node is configured to send a message of synchronously collecting data to the at least one wearable device, to collect a first gait acceleration signal, to extract first gait common information in the first gait acceleration signal, to generate key encryption information according to a key to be distributed and the first gait common information, and to send the key encryption information to the at least one wearable device;
   the at least one wearable device is configured to receive the message of synchronously collecting data, and to synchronously collect a second gait acceleration signal according to the message of synchronously collecting data, to extract second gait common information in the second gait acceleration signal, to receive the key encryption information, and to decrypt the key encryption information to obtain the key to be distributed according to the second gait common information;
   wherein the first gait common information comprises position information corresponding to a peak value and a valley value of the first gait acceleration signal, the second gait common information comprises position information corresponding to a peak value and a valley value of the second gait acceleration signal.

2. The wireless body area network according to claim 1, wherein the coordinator node is further configured to:
   generate the key to be distributed according to a noise signal in the first gait acceleration signal.

3. The wireless body area network according to claim 2, wherein the coordinator node is further configured to:
   extract the noise signal in the first gait acceleration signal;
   encode the noise signal to obtain an initial key; and
   perform a key enhancement operation on the initial key to obtain the key to be distributed.

4. The wireless body area network according to claim 3, wherein the coordinator node is further configured to:
   perform a zero-phase filtering on the first gait acceleration signal to obtain a filtered first gait acceleration signal; and
   subtract the filtered first gait acceleration signal from the first gait acceleration signal to obtain the noise signal.

5. The wireless body area network according to claim 4, wherein the coordinator node is further configured to:
   input the first gait acceleration signal to a low-pass Butterworth filter to obtain a firstly filtered first gait acceleration signal as output by the low-pass Butterworth filter;
   perform a time reversal operation on the firstly filtered first gait acceleration signal to obtain a firstly inverted first gait acceleration signal;

input the firstly inverted first gait acceleration signal into the low-pass Butterworth filter to obtain a secondly filtered first gait acceleration signal as output by the low-pass Butterworth filter;

perform a time reversal operation on the secondly filtered first gait acceleration signal to obtain a secondly inverted first gait acceleration signal, wherein the secondly inverted first gait acceleration signal is the filtered first gait acceleration signal.

6. The wireless body area network according to claim 3, wherein the acceleration acquisition device is a three-axis acceleration sensor, the noise signal comprises a first noise signal of a X-axis, a second noise signal of a Y-axis, and a third noise signal of a Z-axis;

the coordinator node is further configured to:

set a bit corresponding to a first binary random sequence as a corresponding value to obtain a first key according to a numerical value of each bit in the first noise signal;

set a bit corresponding to a second binary random sequence as a corresponding value to obtain a second key according to a numerical value of each bit in the second noise signal; and set a bit corresponding to a third binary random sequence as a corresponding value to obtain a third key according to a numerical value of each bit in the third noise signal;

wherein a kth bit in a binary random sequence is set as a first value if a kth bit in the noise signal is greater than or equal to 0; or the kth bit in the binary random sequence is set as a second value if the kth bit in the noise signal is less than 0, wherein k is an integer.

7. The wireless body area network according to claim 6, wherein the coordinator node is further configured to:

perform an XOR operation on the first key, the second key, and the third key to obtain the key to be distributed;

or, perform an XOR operation on the first key, the second key, and the third key to obtain keys being processed by the XOR operation, and perform a down-sampling on the obtained keys being processed by the XOR operation to obtain the key to be distributed.

8. The wireless body area network according to claim 1, wherein the coordinator node is further configured to:

perform a low-pass filtering on the first gait acceleration signal;

perform a dimension reduction operation on the low-pass filtered first gait acceleration signal to obtain a dimension-reduced first gait acceleration signal; and extract first position information corresponding to a peak value and a valley value of the dimension-reduced first gait acceleration signal in a time domain and in a frequency domain, respectively.

9. The wireless body area network according to claim 8, wherein the coordinator node is further configured to:

extract the first position information corresponding to the peak value and the valley value of the dimension-reduced first gait acceleration signal and the first position information corresponding to the peak value and the valley value of a fast Fourier transform result of the dimension-reduced first gait acceleration signal based on a signed sliding window coding algorithm;

wherein a process of the signed sliding window coding algorithm includes:

the signed sliding window slides on the dimension-reduced first gait acceleration signal, when a peak value occurs in a ith window, a common information pool increases by i; when a valley value occurs in the ith window, the common information pool decreases by i; when a peak value and/or a valley value don't occur in the ith window, the signed sliding window continues to slide, wherein i is an integer.

10. The wireless body area network according to claim 1, wherein the at least one wearable device is further configured to:

perform a low-pass filtering on the second gait acceleration signal;

perform a dimension reduction operation on the low-pass filtered second gait acceleration signal to obtain a dimension-reduced second gait acceleration signal; and extract second position information of the peak value and valley value of the dimension-reduced second gait acceleration signal in a time domain, and second position information of the peak value and valley value of the dimension-reduced second gait acceleration signal in a frequency domain, respectively.

11. The wireless body area network according to claim 10, wherein the at least one wearable device is further configured:

extract second position information corresponding to the peak value and the valley value of the dimension-reduced second gait acceleration signal and second position information corresponding to the peak value and the valley value of a fast Fourier transform result of the dimension-reduced second gait acceleration signal, based on the signed sliding window coding algorithm;

wherein a process of the signed sliding window coding algorithm includes:

the signed sliding window slides on the dimension-reduced first gait acceleration signal, when a peak value occurs in a ith window, a common information pool increases by i; when a valley value occurs in the ith window, the common information pool decreases by i; when a peak value and/or a valley value don't occur in the ith window, the signed sliding window continues to slide, wherein i is an integer.

12. A key distribution method in a wireless body area network being applied to a coordinator node of the wireless body area network, the coordinator node is integrated with an acceleration acquisition device and is in communication with at least one wearable device;

the method comprising:

sending a message of synchronously collecting data to the at least one wearable device, wherein the message of synchronously collecting data instructing the at least one wearable device to collect a second gait acceleration signal synchronously;

collecting a first gait acceleration signal;

extracting first gait common information in the first gait acceleration signal;

generating key encryption information according to a key to be distributed and the first gait common information; and sending the key encryption information to the at least one wearable device to instruct the at least one wearable device to decrypt the received key encryption information to obtain the key to be distributed, according to second gait common information extracted from the second gait acceleration signal;

wherein the first gait common information comprises position information corresponding to a peak value and a valley value of the first gait acceleration signal; the second gait common information comprises position information corresponding to a peak value and a valley value of the second gait acceleration signal.

13. The key distribution method according to claim 12, further comprising: generating the key to be distributed according to a noise signal in the first gait acceleration signal.

14. The key distribution method according to claim 13, wherein said generating the key to be distributed according to a noise signal in the first gait acceleration signal comprises:
    extracting the noise signal in the first gait acceleration signal;
    encoding the noise signal to obtain an initial key; and
    performing a key enhancement operation on the initial key to obtain the key to be distributed.

15. The key distribution method according to claim 14, wherein said extracting the noise signal in the first gait acceleration signal comprises:
    performing a zero-phase filtering on the first gait acceleration signal to obtain a filtered first gait acceleration signal; and
    subtracting the filtered first gait acceleration signal from the first gait acceleration signal to obtain the noise signal.

16. The key distribution method according to claim 15, wherein said performing a zero-phase filtering on the first gait acceleration signal to obtain a filtered first gait acceleration signal comprises:
    inputting the first gait acceleration signal to a low-pass Butterworth filter to obtain a firstly filtered first gait acceleration signal as output by the low-pass Butterworth filter;
    performing a time reversal operation on the firstly filtered first gait acceleration signal to obtain a firstly inverted first gait acceleration signal;
    inputting the firstly inverted first gait acceleration signal into the low-pass Butterworth filter to obtain a secondly filtered first gait acceleration signal as output by the low-pass Butterworth filter; and
    performing a time reversal operation on the secondly filtered first gait acceleration signal to obtain a secondly inverted first gait acceleration signal, wherein the secondly inverted first gait acceleration signal is the filtered first gait acceleration signal.

17. The key distribution method according to claim 14, wherein the acceleration acquisition device is a three-axis acceleration sensor, the noise signal comprises a first noise signal of a X-axis, a second noise signal of a Y-axis, and a third noise signal of a Z-axis;
    said encoding the noise signal to obtain an initial key comprises:
    setting a bit corresponding to a first binary random sequence as a corresponding value to obtain a first key, according to a numerical value of each bit in the first noise signal;
    set a bit corresponding to a second binary random sequence as a corresponding value to obtain a second key, according to a numerical value of each bit in the second noise signal;
    set a bit corresponding to a third binary random sequence as a corresponding value to obtain a third key, according to a numerical value of each bit in the third noise signal;
    wherein a kth bit in a binary random sequence is set as a first value, if a kth bit in the noise signal is greater than or equal to 0; or the kth bit in the binary random sequence is set as a second value, if the kth bit in the noise signal is less than 0, wherein k is an integer.

18. The key distribution method according to claim 17, wherein said performing a key enhancement operation on the key to obtain the key to be distributed comprises:
    performing an XOR operation on the first key, the second key, and the third key to obtain the key to be distributed;
    or,
    performing an XOR operation on the first key, the second key, and the third key to obtain keys being processed by the XOR operation, and
    performing a down-sampling on the obtain keys being processed by the XOR operation to obtain the key to be distributed.

19. The key distribution method according to claim 12, wherein said extracting first gait common information in the first gait acceleration signal comprises:
    performing a low-pass filtering on the first gait acceleration signal;
    performing a dimension reduction operation on the low-pass filtered first gait acceleration signal to obtain a dimension-reduced first gait acceleration signal; and
    extracting first position information corresponding to a peak value and a valley value of the dimension-reduced first gait acceleration signal in a time domain and first position information corresponding to a peak value and a valley value of the dimension-reduced first gait acceleration signal in a frequency domain, respectively.

20. The key distribution method according to claim 19, wherein said respectively extracting first position information corresponding to a peak value and a valley value of the dimension-reduced first gait acceleration signal in a time domain and first position information corresponding to a peak value and a valley value of the dimension-reduced first gait acceleration signal in a frequency domain comprises:
    Extracting the first position information corresponding to the peak value and the valley value of the dimension-reduced first gait acceleration signal and first position information corresponding to the peak value and the valley value of a fast Fourier transform result of the dimension-reduced first gait acceleration signal, based on a signed sliding window coding algorithm;
    wherein a process of the signed sliding window coding algorithm includes:
    the signed sliding window slides on the dimension-reduced first gait acceleration signal, when a peak value occurs in a ith window, a common information pool increases by i; when a valley value occurs in the ith window, the common information pool decreases by i; when a peak value and/or a valley value don't occur in the ith window, the signed sliding window continues to slide, wherein i is an integer.

* * * * *